United States Patent
Wang et al.

(10) Patent No.: US 11,396,683 B2
(45) Date of Patent: Jul. 26, 2022

(54) CONTROL SYSTEM AND METHOD FOR DRY CENTRIFUGAL GRANULATION OF LIQUID SLAG

(71) Applicant: XI'AN JIAOTONG UNIVERSITY, Shaanxi (CN)

(72) Inventors: Shuzhong Wang, Shaanxi (CN); Xi Zhang, Shaanxi (CN); Liwei Ma, Shaanxi (CN); Pengfei Yu, Shaanxi (CN); Jianjun Cai, Shaanxi (CN); Zhongqing Zhang, Shaanxi (CN); Lin Chen, Shaanxi (CN); Haiyu Meng, Shaanxi (CN); Zefeng Jing, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 593 days.

(21) Appl. No.: 16/488,240

(22) PCT Filed: Apr. 13, 2017

(86) PCT No.: PCT/CN2017/080327
§ 371 (c)(1),
(2) Date: Aug. 22, 2019

(87) PCT Pub. No.: WO2018/157451
PCT Pub. Date: Sep. 7, 2018

(65) Prior Publication Data
US 2020/0232064 A1 Jul. 23, 2020

(30) Foreign Application Priority Data
Feb. 28, 2017 (CN) .......................... 201710116640.2

(51) Int. Cl.
*C22B 1/24* (2006.01)
*C21B 3/06* (2006.01)
(52) U.S. Cl.
CPC . *C22B 1/24* (2013.01); *C21B 3/06* (2013.01)
(58) Field of Classification Search
CPC .... C22B 1/00; C22B 1/14; C22B 1/24; C22B 1/26; C21B 3/00; C21B 3/04; C21B 3/06; C21B 3/08; B01J 2/00; B01J 2/14; B01J 2/16; B01J 2/10; B01J 2/12
See application file for complete search history.

(56) References Cited

FOREIGN PATENT DOCUMENTS

| CN | 105624346 A | * | 6/2016 | |
|----|-------------|---|--------|---|
| CN | 105624347 A | * | 6/2016 | ............... C21B 3/06 |

\* cited by examiner

*Primary Examiner* — Vanessa T. Luk
*Assistant Examiner* — Nikolas Takuya Pullen

(57) ABSTRACT

A control system and method for dry centrifugal granulation of liquid slag are provided. The control system includes a granulator cold-air control unit and a feeding unit. The granulator cold-air control unit includes a granulator, a rotating shaft, a motor, and a cold-air supply unit. The granulator is fixed to the motor; the cold-air supply unit includes a shaft cooling air channel and an annular cooling air channel; the shaft cooling air channel consists of an inner duct sleeve and a shaft sleeve; the annular cooling air channel consists of the inner duct sleeve and an outer duct sleeve arranged at periphery of the inner duct sleeve, which have different external diameters; the feeding unit includes a slag dropping pipe arranged above the granulator; a sliding gate is arranged at a lower section of the slag dropping pipe, and an accident diversion spout is equipped.

7 Claims, 1 Drawing Sheet

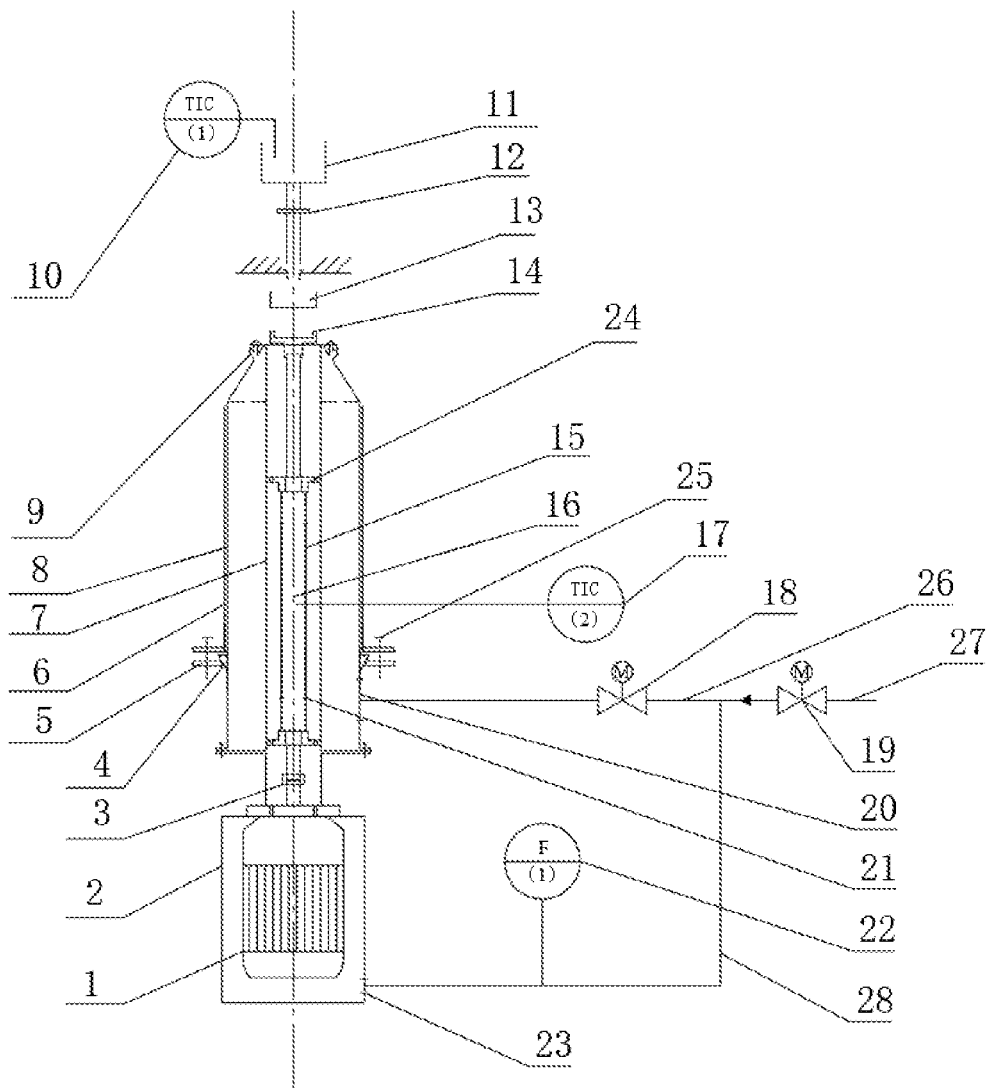

CONTROL SYSTEM AND METHOD FOR DRY CENTRIFUGAL GRANULATION OF LIQUID SLAG

CROSS REFERENCE OF RELATED APPLICATION

This is a U.S. National Stage under 35 U.S.C. 371 of the International Application PCT/CN2017/080327, filed Apr. 13, 2017, which claims priority under 35 U.S.C. 119(a-d) to CN 201710116640.2, filed Feb. 28, 2017.

BACKGROUND OF THE PRESENT INVENTION

Field of Invention

The present invention relates to a technical field of liquid slag granulation, and more particularly to a control system and method for dry centrifugal granulation of liquid slag.

Description of Related Arts

Currently, China is the largest steel producer in the world, and Chinese steel output ranks first in the world. In 2015, the pig iron output of China reaches 691 million tons, accounting for about 60% of the world total output. In 2016, the pig iron output of ten months of China is 586 million tons, accounting for about 60% of the world total output. During the smelting process of pig iron, the blast furnace slag containing the huge energy is generated; the tapping temperature of the blast furnace slag is generally between 1400-1550° C.; each ton of blast furnace slag contains sensible heat of $(1260-1880)\times10^3$ kJ, which is equivalent to 60 kg standard coal. Under the existing iron-making technology of China, when every ton of pig iron is produced, 0.3 tons of blast furnace slag as the by-product is produced. If calculating according to the current pig iron output of China of 586 million tons, more than 175 million tons of blast furnace slag will be generated, and the sensible heat thereof is equivalent to 10.5 million tons of standard coal.

The dry slag pit cooling method and the slag washing method are currently the most common blast furnace slag processing methods in China. The dry slag pit cooling method is to directly discharge the high-temperature liquid slag into the dry slag pit for air cooling, assisted with water cooling. With the above method, when cooling, a great amount of vapor is generated, and meanwhile a great amount of $H_2S$ and $SO_2$ is released, which will corrode the buildings, damage the equipment and deteriorate the working environment, so that the above method is generally applied only when accident handling. In China, 90% of the blast furnace slag is processed with the slag washing method. The slag washing method is to directly mix the low-temperature cooling water with the high-temperature liquid slag, so that the temperature of the liquid slag rapidly decreases and the glass-state slag particles are formed. According to different technical processes, the slag washing method can be divided into the INBA method, TYNA method, OCP method, RASA method, and MTC method. Although the slag washing technology continuously develops, the technical core thereof is still to process the high-temperature liquid slag with water quenching, so as to achieve cooling and granulating; thereafter, water and slag are separated, and the slag washing water is reused after precipitating and filtering. Although the glass-state slag generated through the above method can be applied in the cement industry for resource utilization, during the treating process, a great amount of water resource is wasted, the harmful gases such as $SO_2$ and $H_2S$ are generated, and the high-quality waste heat resource contained in the high-temperature liquid slag cannot be effectively recovered.

During the dry centrifugal granulation process of blast furnace slag, the liquid slag drops to the surface of the rotary table which rotates in a high speed, and then is spun out under the effects of centrifugal force and friction force; then small droplets are formed under the effect of the surface tension of the liquid slag; the small droplets make a forced convection heat transfer with the heat transfer medium (generally being air) in the space, for realizing the radiation heat transfer with the ambient environment, so that the temperature of the small droplets rapidly decreases and a phase change happens, thereby forming the solidified layer. With the further decreased temperature, the droplets gradually transform into the small solid particles. During the granulation process of liquid blast furnace slag, the motor drives the granulator to rotate in a high speed through the rotating shaft. Meanwhile, the molten blast furnace slag continuously drops to the granulator. Conventionally, the dry granulation technology has following problems in the granulation process of liquid blast furnace slag.

Firstly, under the high-temperature environment, the shape of the rotating shaft of the motor easily changes. The temperature of the liquid blast furnace slag entering the granulation chamber is above 1350° C., and the heat of the blast furnace slag is transferred from the granulator to the rotating shaft. Under the high temperature, the intensity of the steel rotating shaft decreases, which requires cooling the rotating shaft, so as to ensure that the rotating shaft runs in a certain temperature range. The factors influencing the temperature of the rotating shaft comprise the flow of the shaft cooling air and the flow of the liquid slag, and the influence factors are required to be prioritized, so as to control the temperature of the rotating shaft in the certain range with ensuring the safe and high-efficient operation of the system.

Secondly, the particle diameter distribution interval of the slag particles is large, which influences the subsequent high-efficient recovery of waste heat. The size of the slag particles is the major factor influencing the granulation effect of slag. Therefore, during the granulation process, the control on the particle diameter of slag is very important. The diameter of slag particles is influenced by many factors, comprising the temperature of liquid slag, the disturbance of wind, and the rotation speed of the motor. Thus, the coordination among the factors is required, so as to achieve the good granulation effect.

Thirdly, when an accident happens, the way of processing the high-temperature liquid slag in the slag dropping pipe is unclear. During the operation process of the granulation system, if an accident happens, for example the granulator is damaged or the granulation motor is damaged, the system is unable to granulate the liquid slag in the slag dropping pipe, and meanwhile the temperature of the liquid slag is above 1350° C.; if the liquid slag continues dropping to the rotary table, the granulation chamber will be greatly damaged. Therefore, a perfect accident control method is required, for properly handling the liquid slag in the slag dropping pipe.

SUMMARY OF THE PRESENT INVENTION

An object of the present invention is to provide a control system and method for dry centrifugal granulation of liquid slag, so as to solve above technical problems. The present invention is able to keep a temperature of a rotating shaft in a reasonable range, effectively adjust a diameter of slag particles, and properly handle the non-granulated liquid slag when an accident of a granulator occurs, so as to ensure a safe and stable operation of the granulator, realize a better granulation effect, and make preparations for a subsequent high-efficient recovery of waste heat.

In order to accomplish the above object, the present invention adopts technical solutions as follows.

A control system for dry centrifugal granulation of liquid slag is provided, comprising a granulator cold-air control unit and a feeding unit, wherein:

the granulator cold-air control unit comprises a granulator, a rotating shaft, a motor and a cold-air supply unit; a bottom of the granulator is fixed to the motor arranged vertically through the rotating shaft; a second temperature measurement component, for monitoring a temperature of the rotating shaft, is arranged on the rotating shaft; the motor is sealed through a sealing cover; an air vent is provided on the sealing cover; a shaft sleeve is sleeved at periphery of the rotating shaft; an inner duct sleeve is fixed on the sealing cover; the inner duct sleeve is arranged at periphery of the shaft sleeve; the shaft sleeve is supported within the inner duct sleeve through a bearing with an air vent; a top of the sealing cover is intercommunicated with the inner duct sleeve; and, cooling air vents are annularly and symmetrically provided on the shaft sleeve;

the cold-air supply unit comprises a shaft cooling air channel and an annular cooling air channel; a master control valve is arranged on a cold-air main; an exit of the master control valve is divided into a shaft cooling air branch and an annular cooling air branch; a control valve for the annular cooling air branch is arranged on the annular cooling air branch; a flowmeter is arranged on the shaft cooling air branch; the shaft cooling air channel consists of the inner duct sleeve and the shaft sleeve; the annular cooling air channel consists of the inner duct sleeve and an outer duct sleeve arranged at periphery of the inner duct sleeve, which have different external diameters; an air intake is provided at a bottom of the outer duct sleeve, and an air cap is arranged at a top of the outer duct sleeve; the shaft cooling air branch is connected to the air vent at a bottom of the sealing cover; and, the annular cooling air branch is connected to the air intake at the bottom of the outer duct sleeve; and the feeding unit comprises a slag dropping pipe which is arranged above the granulator; the slag dropping pipe is divided into an upper section and a lower section; a diameter of the upper section is larger than a diameter of the lower section; a sliding gate is arranged at the lower section, and an accident diversion spout is equipped; and, a first temperature measurement component, for monitoring a temperature of the liquid slag in the slag dropping pipe, is arranged in the slag dropping pipe.

Preferably, the cooling air vents are strip-shaped.

Preferably, a wedge-shaped fixed block is welded on an outer surface of the outer duct sleeve of the annular cooling air channel, and matches with a sliding block; the sliding block is fixed with a fixed support through a pin; through twisting the pin, a position of the sliding bock is adjusted, and a distance between the granulator and the slag dropping pipe is further adjusted, so that an adjustment of a dropping height of the liquid slag is realized.

Preferably, a plurality of air caps are annularly arranged at periphery of a lower part of the granulator, for further cooling the slag flying out of the granulator and facilitating granulation.

Preferably, an air outlet of an upper part of the inner duct sleeve is arranged at a lower part of the granulator; shaft cooling air in the shaft cooling air channel further cools the rotating shaft through a vent hole, and then leaves from the upper part of the inner duct sleeve for cooling the granulator.

A control method of the control system for the dry centrifugal granulation of the liquid slag comprises steps of temperature adjustment of the rotating shaft, particle diameter adjustment of granulation and accident control, wherein:

the step of temperature adjustment of the rotating shaft particularly comprises steps of: when the temperature of the rotating shaft measured by the second temperature measurement component is higher than a set temperature, decreasing an opening degree of the control valve of the annular cooling air channel, and increasing an opening degree of the master control valve, so that an air volume entering the shaft cooling air channel increases; cooling the rotating shaft by shaft cooling air through the shaft cooling air channel; if requirements are still unable to be met through above adjustment, decreasing a slag feeding amount of the feeding unit to the granulator;

the step of particle diameter adjustment of granulation particularly comprises steps of: if a particle diameter of the slag exceeds a set value, firstly checking a slag feeding temperature measured by the first temperature measurement component; if the slag feeding temperature is lower than a set value, requiring afterburning before slag feeding, so as to increase the slag feeding temperature; if the slag feeding temperature meets requirements, gradually increasing a rotation speed of the motor; if the particle diameter is still unable to meet requirements with a maximum rotation speed of the motor, adjusting the opening degree of the control valve of the annular cooling air branch, increasing a volume of annular cooling air, and meanwhile decreasing the slag feeding amount; if the particle diameter is lower than the set value, decreasing the rotation speed of the motor; and the step of accident control particularly comprises steps of: when the granulator is damaged, firstly stopping feeding the slag, and closing the sliding gate; placing the accident diversion spout between the slag dropping pipe and the granulator, and keeping a rotation speed of the granulator constant; after all the slag in the slag dropping pipe flows out, closing the motor; and, after a temperature of the granulator decreases to a room temperature, replacing the granulator.

Compared with the prior art, the present invention has following advantages.

Through the granulator cold-air control unit, the present invention effectively decreases the working temperature of the motor and the rotating shaft, and guarantees the long-time normal operation thereof, so as to ensure the safe and stable operation of the granulator and realize a better granulation effect.

The present invention reasonably controls a particle diameter distribution and ensures that the particle diameter is in a range of 2-3 mm, so as to meet the granulation requirements, which is beneficial to the subsequent high-efficient recovery of the waste heat.

The present invention effectively realizes the accident control, ensures that the granulator can be rapidly and highly-efficiently replaced after being damaged, prevents the human injury, and decreases the unnecessary equipment damage and economic loss.

BRIEF DESCRIPTION OF THE DRAWINGS

The present invention is further illustrated in detail with the accompanying drawing and the preferred embodiment.

The FIGURE is a structural sketch view of a control system for dry centrifugal granulation of liquid slag according to the present invention.

In the FIGURE: 1: motor; 2: sealing cover; 3: coupler; 4: wedge-shaped fixed block; 5: sliding block; 6: fixed support; 7: inner duct sleeve; 8: outer duct sleeve; 9: air cap; 10: first temperature measurement component; 11: slag dropping pipe; 12: sliding gate; 13: accident diversion spout; 14: granulator; 15: shaft sleeve; 16: rotating shaft; 17: second temperature measurement component; 18: control valve; 19: master control valve; 20: air intake; 21: cooling air vent; 22: flowmeter; 23: air vent; 24: bearing; 25: pin; 26: annular cooling air branch; 27: cold-air main; and 28: shaft cooling air branch.

DETAILED DESCRIPTION OF THE PREFERRED EMBODIMENT

Referring to the FIGURE, according to the preferred embodiment of the present invention, a control system for dry centrifugal granulation of liquid slag is provided, comprising a granulator cold-air control unit and a feeding unit.

The granulator cold-air control unit comprises a granulator 14, a rotating shaft 16, a motor 1 and a cold-air supply unit. A bottom of the granulator 14 is fixed to the motor 1 through the rotating shaft 16; a second temperature measurement component 17, for monitoring a temperature of the rotating shaft, is arranged on the rotating shaft 16; the motor 1, which is vertical, is connected to the rotating shaft 16 through a coupler 3; the motor 1 is sealed through a sealing cover 2; an air vent 23 is provided on the sealing cover 2; a shaft sleeve 15 is sleeved at periphery of the rotating shaft 16; an inner duct sleeve 7 is fixed on the sealing cover 2; the inner duct sleeve 7 is arranged at periphery of the shaft sleeve 15; the shaft sleeve 15 is supported within the inner duct sleeve 7 through a bearing 24 with an air vent; a top of the sealing cover 2 is intercommunicated with the inner duct sleeve 7; cooling air vents 21 are annularly and symmetrically provided on the shaft sleeve 15, and the cooling air vents are strip-shaped.

The cold-air supply unit comprises a shaft cooling air channel and an annular cooling air channel; a master control valve 19 is arranged on a cold-air main 27; an exit of the master control valve is divided into a shaft cooling air branch 28 and an annular cooling air branch 26; a control valve 18 is arranged on the annular cooling air branch 26; a flowmeter 22 is arranged on the shaft cooling air branch 28; the shaft cooling air channel consists of the inner duct sleeve 7 and the shaft sleeve 15; the annular cooling air channel consists of two duct sleeves having different external diameters (respectively the inner duct sleeve 7 and an outer duct sleeve 8); an air intake 20 is provided at a bottom of the outer duct sleeve 8, and an air cap 9 is arranged at a top of the outer duct sleeve; the shaft cooling air branch 28 is connected to the air vent 23 at a bottom of the sealing cover 2; and, the annular cooling air branch 26 is connected to the air intake 20 at the bottom of the outer duct sleeve 8.

A wedge-shaped fixed block 4 is welded on an outer surface of the outer duct sleeve 8 of the annular cooling air channel, and matches with a sliding block 5; and, the sliding block 5 is fixed with a fixed support 6 through a pin 25. Through twisting the pin 25, a position of the sliding bock is adjusted, and a height of the whole granulator cold-air control unit is further adjusted, so that an adjustment of a dropping height of the liquid slag is realized and a temperature of the slag dropping into the granulator is able to be controlled to some extent, thereby controlling a temperature transferred to the rotating shaft. Meanwhile, the adjustment of the dropping height of the liquid slag also realizes a particle diameter adjustment, so that a better granulation effect is achieved.

The feeding unit comprises a slag dropping pipe 11 which is arranged above the granulator 14. The slag dropping pipe 11 is divided into an upper section and a lower section; a diameter of the upper section is larger than a diameter of the lower section; a sliding gate 12 is arranged at the lower section, and an accident diversion spout 13 is equipped. After passing through the upper section and the lower section of the slag dropping pipe, the liquid slag drops into the rotary granulator 14 for centrifugal granulation. A first temperature measurement component 10, for monitoring a temperature of the liquid slag in the slag dropping pipe 11, is arranged in the slag dropping pipe 11.

Annular cooling air enters from the air intake 20 and leaves from the air cap 9 at the top of the outer duct sleeve; and, the air cap 9 is arranged at periphery of a lower part of the granulator, for further cooling the slag flying out of the granulator 14 and facilitating granulation. Shaft cooling air enters from the air vent 23 at a lower part of the sealing cover 2, for cooling the motor, so that a temperature increase of the rotating shaft caused by transferring heat generated during operation of the motor to the rotating shaft is avoided, and an operation reliability and a service life of the motor are improved; the shaft cooling air in the sealing cover 2 enters the shaft cooling air channel through a vent hole; the strip-shaped cooling air vents 21 are annularly and symmetrically provided on the shaft sleeve 15, for better cooling the rotating shaft 16, preventing the rotating shaft from overheating and deforming, and avoiding affecting the granulation effect of the granulator 14; the shaft cooling air in the shaft cooling air channel further cools the rotating shaft through an upper vent hole, and then leaves from an upper part of the inner duct sleeve 7 for cooling the granulator 14.

A control method of the control system for the dry centrifugal granulation of the liquid slag comprises steps of temperature adjustment of the rotating shaft, particle diameter adjustment of granulation and accident control, wherein:

the step of temperature adjustment of the rotating shaft particularly comprises steps of: when the temperature of the rotating shaft measured by the second temperature measurement component 17 is higher than a set temperature, decreasing an opening degree of the control valve 18 of the annular cooling air channel, and increasing an opening degree of the master control valve 19, so that a total air volume entering the control system increases; through the flowmeter 22, observing that a volume of the shaft cooling air increases, and cooling the rotating shaft by the shaft cooling air through the optimized shaft cooling air channel; if requirements are still unable to be met through above adjustment, requiring decreasing a slag feeding amount of the feeding unit;

the step of particle diameter adjustment of granulation particularly comprises steps of: if a particle diameter exceeds a set value, firstly checking a slag feeding temperature measured by the first temperature measurement component 10; if the slag feeding temperature is lower than a set value, requiring afterburning before slag feeding, so as to increase the slag feeding temperature; if the slag feeding temperature meets requirements, gradually increasing a rotation speed of the motor 1; if the particle diameter is still unable to meet requirements with a maximum rotation speed of the motor, adjusting the opening degree of the control valve 18 of the annular cooling air channel, increasing the volume of the annular cooling air, and meanwhile decreasing the slag feeding amount; if the particle diameter is lower than the set value, decreasing the rotation speed of the motor; and the step of accident control particularly comprises steps of: when the granulator 14 is damaged, firstly stopping feeding the slag, and closing the sliding gate 12; placing the accident diversion spout 13 between the slag dropping pipe 11 and the granulator 14, and keeping a rotation speed of the granulator constant; after all the slag in the slag dropping pipe flows out, closing the motor 1; and, after a temperature of the granulator decreases to a room temperature, replacing the granulator.

It should be noted that the above preferred embodiment is only for illustrating the present invention, not for limiting the present invention. Although the present invention is illustrated in detail with the preferred embodiment, it should be understood that one skilled in the art can still make modifications and equivalent replacements on the present invention. Therefore, the technical solutions and improvements thereof without departing from the spirit and scope of the present invention should be all encompassed in the scope of the claims of the present invention.

What is claimed is:

1. A control system for dry centrifugal granulation of liquid slag, comprising a granulator cold-air control unit and a feeding unit, wherein:

the granulator cold-air control unit comprises a granulator (14), a rotating shaft (16), a motor (1) and a cold-air supply unit; a bottom of the granulator (14) is fixed to the motor (1) arranged vertically through the rotating shaft (16); a second temperature measurement component (17), for monitoring a temperature of the rotating shaft, is arranged on the rotating shaft (16); the motor (1) is sealed through a sealing cover (2); an air vent (23) is provided on the sealing cover (2); a shaft sleeve (15) is sleeved at periphery of the rotating shaft (16); an inner duct sleeve (7) is fixed on the sealing cover (2); the inner duct sleeve (7) is arranged at periphery of the shaft sleeve (15); the shaft sleeve (15) is supported within the inner duct sleeve (7) through a bearing (24) with an air vent; a top of the sealing cover (2) is intercommunicated with the inner duct sleeve (7); and, cooling air vents (21) are annularly and symmetrically provided on the shaft sleeve (15);

the cold-air supply unit comprises a shaft cooling air channel and an annular cooling air channel; a master control valve (19) is arranged on a cold-air main (27); an exit of the master control valve is divided into a shaft cooling air branch (28) and an annular cooling air branch (26); a control valve (18) for the annular cooling air branch is arranged on the annular cooling air branch (26); a flowmeter (22) is arranged on the shaft cooling air branch (28); the shaft cooling air channel consists of the inner duct sleeve (7) and the shaft sleeve (15); the annular cooling air channel consists of the inner duct sleeve (7) and an outer duct sleeve (8) arranged at periphery of the inner duct sleeve (7), which have different external diameters; an air intake (20) is provided at a bottom of the outer duct sleeve (8), and an air cap (9) is arranged at a top of the outer duct sleeve; the shaft cooling air branch (28) is connected to the air vent (23) at a bottom of the sealing cover (2); and, the annular cooling air branch (26) is connected to the air intake (20) at the bottom of the outer duct sleeve (8); and the feeding unit comprises a slag dropping pipe (11) which is arranged above the granulator (14); the slag dropping pipe (11) is divided into an upper section and a lower section; a diameter of the upper section is larger than a diameter of the lower section; a sliding gate (12) is arranged at the lower section, and an accident diversion spout (13) is equipped; and, a first temperature measurement component (10), for monitoring a temperature of the liquid slag in the slag dropping pipe (11), is arranged in the slag dropping pipe (11).

2. The control system, as recited in claim 1, wherein: the cooling air vents (21) are strip-shaped.

3. The control system, as recited in claim 1, wherein: a wedge-shaped fixed block (4) is welded on an outer surface of the outer duct sleeve (8) of the annular cooling air channel, and matches with a sliding block (5); the sliding block (5) is fixed with a fixed support (6) through a pin (25); through twisting the pin (25), a position of the sliding bock is adjusted, and a distance between the granulator (14) and the slag dropping pipe (11) is further adjusted, so that an adjustment of a dropping height of the liquid slag is realized.

4. The control system, as recited in claim 1, wherein: a plurality of air caps (9) are annularly arranged at periphery of a lower part of the granulator, for further cooling the slag flying out of the granulator (14) and facilitating granulation.

5. The control system, as recited in claim 1, wherein: an air outlet of an upper part of the inner duct sleeve (7) is arranged at a lower part of the granulator (14); shaft cooling air in the shaft cooling air channel further cools the rotating shaft through a vent hole, and then leaves from the upper part of the inner duct sleeve (7) for cooling the granulator (14).

6. A control method of the control system for the dry centrifugal granulation of the liquid slag as recited in claim 1, comprising steps of temperature adjustment of the rotating shaft, particle diameter adjustment of granulation and accident control, wherein:

the step of temperature adjustment of the rotating shaft particularly comprises steps of: when the temperature of the rotating shaft measured by the second temperature measurement component (17) is higher than a set temperature, decreasing an opening degree of the control valve (18) of the annular cooling air channel, and increasing an opening degree of the master control valve (19), so that an air volume entering the shaft cooling air channel increases; cooling the rotating shaft by shaft cooling air through the shaft cooling air channel; if requirements are still unable to be met through above adjustment, decreasing a slag feeding amount of the feeding unit to the granulator (14);

the step of particle diameter adjustment of granulation particularly comprises steps of: if a particle diameter of the slag exceeds a set value, firstly checking a slag feeding temperature measured by the first temperature measurement component (10); if the slag feeding temperature is lower than a set value, requiring afterburning before slag feeding, so as to increase the slag feeding temperature; if the slag feeding temperature meets requirements, gradually increasing a rotation speed of the motor (1); if the particle diameter is still unable to meet requirements with a maximum rotation speed of the motor (1), adjusting the opening degree of the control valve (18) of the annular cooling air branch (26), increasing a volume of annular cooling air, and meanwhile decreasing the slag feeding amount; if the particle diameter is lower than the set value, decreasing the rotation speed of the motor; and the step of accident control particularly comprises steps of: when the granulator (14) is damaged, firstly stopping feeding the slag, and closing the sliding gate (12); placing the accident diversion spout (13) between the slag dropping pipe (11) and the granulator (14), and keeping a rotation speed of the granulator constant;

after all the slag in the slag dropping pipe flows out, closing the motor (1); and, after a temperature of the granulator decreases to a room temperature, replacing the granulator.

7. A control method of the control system for the dry centrifugal granulation of the liquid slag as recited in claim 3, comprising steps of temperature adjustment of the rotating shaft, particle diameter adjustment of granulation and accident control, wherein:

the step of temperature adjustment of the rotating shaft particularly comprises steps of: when the temperature of the rotating shaft measured by the second temperature measurement component (17) is higher than a set temperature, decreasing an opening degree of the control valve (18) of the annular cooling air channel, and increasing an opening degree of the master control valve (19), so that an air volume entering the shaft cooling air channel increases; cooling the rotating shaft by shaft cooling air through the shaft cooling air channel; if requirements are still unable to be met through above adjustment, decreasing a slag feeding amount of the feeding unit to the granulator (14);

the step of particle diameter adjustment of granulation particularly comprises steps of: if a particle diameter of the slag exceeds a set value, firstly checking a slag feeding temperature measured by the first temperature measurement component (10); if the slag feeding temperature is lower than a set value, requiring afterburning before slag feeding, so as to increase the slag feeding temperature; if the slag feeding temperature meets requirements, gradually increasing a rotation speed of the motor (1); if the particle diameter is still unable to meet requirements with a maximum rotation speed of the motor (1), adjusting the opening degree of the control valve (18) of the annular cooling air branch (26), increasing a volume of annular cooling air, and meanwhile decreasing the slag feeding amount; if the particle diameter is lower than the set value, decreasing the rotation speed of the motor; and the step of accident control particularly comprises steps of: when the granulator (14) is damaged, firstly stopping feeding the slag, and closing the sliding gate (12); placing the accident diversion spout (13) between the slag dropping pipe (11) and the granulator (14), and keeping a rotation speed of the granulator constant; after all the slag in the slag dropping pipe flows out, closing the motor (1); and, after a temperature of the granulator decreases to a room temperature, replacing the granulator.

* * * * *